W. F. Horton,
Pump Chain.
Nº 19,173. Patented Jan. 19, 1858.
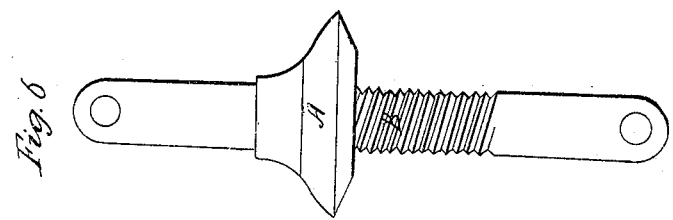
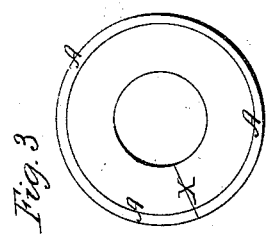 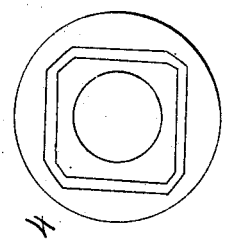 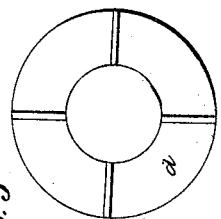
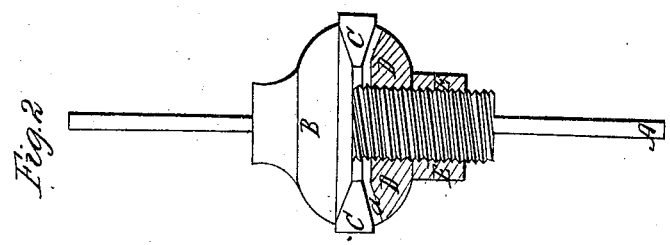
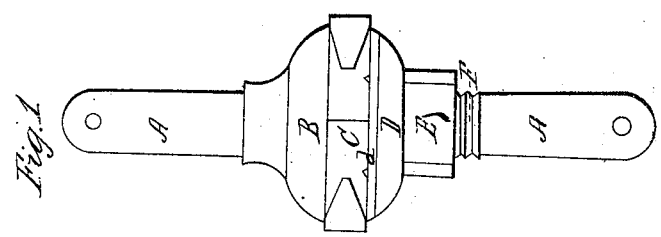

UNITED STATES PATENT OFFICE.

WM. F. HORTON, OF LOCKPORT, NEW YORK, ASSIGNOR TO WALTER K. MARVIN, OF NEW YORK, N. Y.

PUMP-BUCKET.

Specification of Letters Patent No. 19,173, dated January 19, 1858.

*To all whom it may concern:*

Be it known that I, WM. F. HORTON, of Lockport, in the county of Niagara and State of New York, have invented certain new and useful Improvements in Pump-Buckets; and I do hereby declare that the following is a full, clear, and exact description of the same, reference being had to the accompanying drawings and to the letters of reference marked thereon.

The nature of my invention consists in the peculiar arrangement, and combination of the flanges, packing and corrugated washer, secured and operated in the manner herein after described.

In order that others skilled in the arts may use and manufacture my invention I will proceed to describe its operation and construction.

In the accompanying drawings which make a part of this specification, Figure 1 represents the bucket with all of its parts arranged together ready for being attached to the chain in the well. In this figure A, represents a small iron shaft about five inches in length. B, is a flange firmly attached to shaft A, and is made enough smaller than the pipe or tube into which it enters so that it will not touch it as it passes through. C, is a piece of leather packing which is made concave on both sides and large enough in diameter to extend one quarter of an inch beyond the flange B, all around, this packing C, is cut as seen in Fig. 3, and as will be described. *d*, is a washer which is made corrugated for the purpose of securing the two ends of the packing. It is not necessary that there should be more than two corrugations on said washer, these two being so situated with reference to the packing that the two ends of said packing will be impressed and thus secured together—the washer may be made almost commensurate with the packing, so that when the packing wears, it may be opened to fit the tube, and the washer, extending over the packing will close the opening made by its expansion. D, is a flange attached to nut E, and made the same size as flange B, both of these flanges, being made convex on their sides which are presented to the packing, E, is a nut, which passes over screw F, on shaft A, and secures the packing in its place.

Fig. 2 represents a section of this bucket, showing the flanges, B and D, and their convexity; the packing C, and its concavity and the washer *d*.

Fig. 4 is a top view of the nut E, seen in Figs. 1 and 2.

Fig. 6 represents the shaft, marked A, in Figs. 1 and 2, with the nut, packing, and washer removed.

Fig. 3, represents the packing, A, A, representing the portion of the packing which extends beyond the flanges. X shows the two parts of the packing when brought together.

Fig. 5 shows the washer and its corrugations for securing the ends of the packing together.

In operating this bucket the chain is attached to each end of the shaft A, Fig. 1, the nut E, is unscrewed so as to allow of the packing being inserted between flange D, and flange B, the two parts of the packing are then separated so that the shaft will go between them, and it is adjusted to its position between the two flanges, D and B. Nut E is then screwed up and the packing C, is tightly embraced between the flange D, with washer *d*, and flange B—this packing being made to fit the tubing tightly—it is inserted into the tube of the pump and is ready for operation. Thus it will be seen that whenever by the rubbing of the packing against the tube the packing is worn so as not to hold the water—the nut E, may be loosened and a fresh piece of packing inserted without removing the bucket from the well, or cutting the chain as must be the case with other buckets—thus making a bucket for chain pumps which is effective and cheap and easily renewed without being removed from the well.

I do not claim any single member of this bucket as new, either shaft flanges, washer or packing. But

I claim—

The peculiar arrangement of the flanges, D and B, with the corrugated washer *d*, and packing C, when all are operated and secured in the manner herein described and for the purpose set forth.

WM. F. HORTON.

Witnesses:
D. W. COLE,
OSCAR CRAIG.